United States Patent
Denzinger (10) Patent No.: US 6,467,775 B1
(45) Date of Patent: Oct. 22, 2002

(54) CLAMPING DEVICE FOR OBJECTS, FOR EXAMPLE FOR WORKPIECES TO BE TREATED

(75) Inventor: Otto Denzinger, Wendlingen (DE)

(73) Assignee: C. Stiefelmayer GmbH & Co. KG, Denkendorf (DE)

( * ) Notice: Subject to any disclaimer, the term of this patent is extended or adjusted under 35 U.S.C. 154(b) by 0 days.

(21) Appl. No.: 09/577,536

(22) Filed: May 24, 2000

(30) Foreign Application Priority Data

May 25, 1999 (DE) .......................................... 199 23 752

(51) Int. Cl.[7] ........................ B23B 31/30; B23B 31/175
(52) U.S. Cl. ................... 279/4.12; 279/2.09; 279/2.18; 279/119; 279/132
(58) Field of Search ............................. 279/2.09, 2.18, 279/4.12, 4.11, 2.07, 119, 132, 133

(56) References Cited

U.S. PATENT DOCUMENTS

| | | | | |
|---|---|---|---|---|
| 2,948,540 A | * | 8/1960 | Garberding ................ | 279/4.12 |
| 3,076,662 A | * | 2/1963 | Kostyrka .................... | 279/4.11 |
| 3,612,553 A | * | 10/1971 | Ovanin ....................... | 279/4.12 |
| 3,684,304 A | * | 8/1972 | Dexter et al. ............... | 279/119 |
| 3,751,053 A | * | 8/1973 | Swanson .................... | 279/119 |
| 3,814,448 A | * | 6/1974 | Buck .......................... | 279/4.12 |
| 3,858,893 A | * | 1/1975 | Ovanin ....................... | 279/119 |
| 3,904,214 A | * | 9/1975 | Manchester ................ | 279/4.11 |
| 4,598,917 A | * | 7/1986 | Hiestand .................... | 279/4.12 |

FOREIGN PATENT DOCUMENTS

EP 0 800 884 A2 10/1997

* cited by examiner

Primary Examiner—Steven C. Bishop
(74) Attorney, Agent, or Firm—Michael J. Striker

(57) ABSTRACT

A clamping device for objects, has a housing, at least two clamping jaws which is radially displaceably guided relative to a longitudinal central axis, actuating elements associated with the clamping jaws for actuating the latter, clamping pistons displaceable in a cylinder chamber and acted for clamping of the clamping jaws by a pressure medium under pressure at least in one working direction, the actuating element being in operative communication with the clamping piston at least in a working position, at least one central adjusting device displaceably arranged in the housing and acting on the actuating elements, abutment means including an abutment for each of the actuating element against which each of the actuating elements can abut, the actuating elements being formed as angular levers which are turnably held in the housing and engage at one end with associated one of the clamping pistons and on the other hand with an associated one of the clamping jaws.

40 Claims, 4 Drawing Sheets

CLAMPING DEVICE FOR OBJECTS, FOR EXAMPLE FOR WORKPIECES TO BE TREATED

BACKGROUND OF THE INVENTION

The present invention relates to a clamping device for objects, for example for workpieces to be treated.

One of such clamping devices is disclosed in the patent document EP 800 884 82. It is believed that the existing clamping device can be further improved.

SUMMARY OF THE INVENTION

Accordingly, it is an object of present invention to provide a clamping device for objects, for example for workpieces to be treated which is designed simply and cost-favorably, and is suitable both for outer clamping and an inner clamping.

In keeping with these objects and with others which will become apparent hereinafter, one feature of present invention resides, briefly stated, in a clamping device for objects, which has a housing, at least two clamping jaws which is radially displaceably guided relative to a longitudinal central axis; actuating element associated with said clamping jaws for actuating the latter; clamping pistons displaceable in a cylinder chamber and acted for clamping of said clamping jaws by a pressure medium under pressure at least in one working direction, said actuating element being in operative communication with said clamping piston at least in a working position; at least one central adjusting device displaceably arranged in said housing and acting on said actuating elements; abutment means including an abutment for each of said actuating element against which each of said actuating elements can abut, said actuating elements being formed as angular levers which is turnably held in said housing and engage at one end with associated one of said clamping pistons and on the other hand with an associated one of said clamping jaws.

When the clamping device is designed in accordance with the present invention, it is suitable both for outer clamping and simultaneously also for inner clamping. With a corresponding arrangement of outer clamping surfaces and inner clamping surfaces on the clamping jaws, it can be used as an outer and inner clamping device equally. The clamping device requires only a few components which are suitable both for the outer clamping device and the inner clamping device, so that the number of components is reduced. It has an additional advantage that the clamping device is designed as a centering and in particular hydraulically equalizing jaw chuck. It can have at least one tool clamping jaw and depending on the design can include more clamping jaws, for example three clamping jaws or four, six, eight, ten, twelve, or depending on the conditions also an odd number of clamping jaws.

The clamping device has the advantage that at least during performing of a clamping process, several clamping jaws or all clamping jaws gently lie on the object to be clamped with accompanying automatic centering, before a uniform clamping force is applied by the clamping jaws. The clamping jaws in a known manner can be single-component or two-component or multi-component jaws. When needed, also swinging jaws can be used, in which the number of force applying points is doubled, which can lead to fine clamping of the objects to be clamped. During clamping also with an asymmetrical outlet position, the clamping forces are applied symmetrically so that the object is clamped uniformly. The clamping device is compact and space-consuming and allows a flat construction.

It is also advantageous that with the clamping device of the invention, the clamping forces are transmitted and also long clamping paths can be covered. It is a further advantageous that due to the lever arrangement of the individual elements, a force application is provided and at least partially by lever action a centrifugal force equalization is obtained.

Depending on the clamping objectives, the clamping device has at least two clamping jaws. When needed, also four or more clamping jaws can be provided, with the advantage that an odd number of clamping jaws is used, which is not however completely necessary. Since the clamping device in the output position is loaded with an opening force, against which it is necessary for work for transfer to the clamping position, it is guaranteed that in the output condition all clamping jaws are in the same output position.

During contacting the object which is clamped and resulting centering, a force which is only insignificantly greater than the opening force is required, whereby the clamping jaws abut relatively tight against the object to be clamped before, by the acting on the clamping piston, a uniform clamping force is applied by the clamping jaws to the object.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
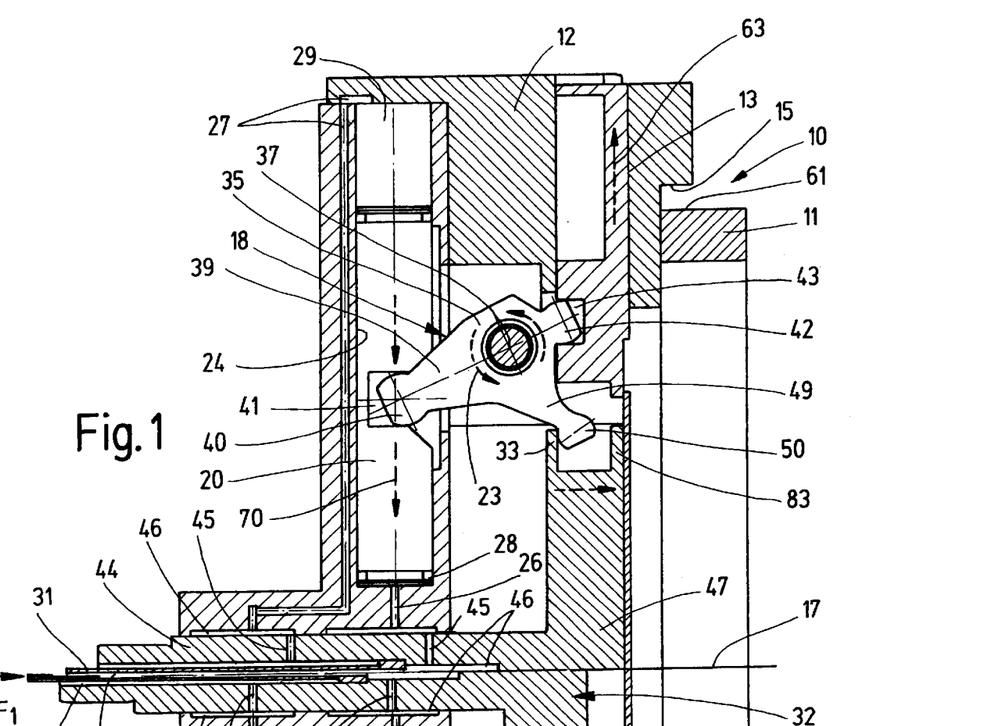
FIGS. 1 and 2 are views showing a schematic cross-section of the clamping device for outer clamping, in released position in FIG. 1 and in clamped position in FIG. 2.
Figure 2:
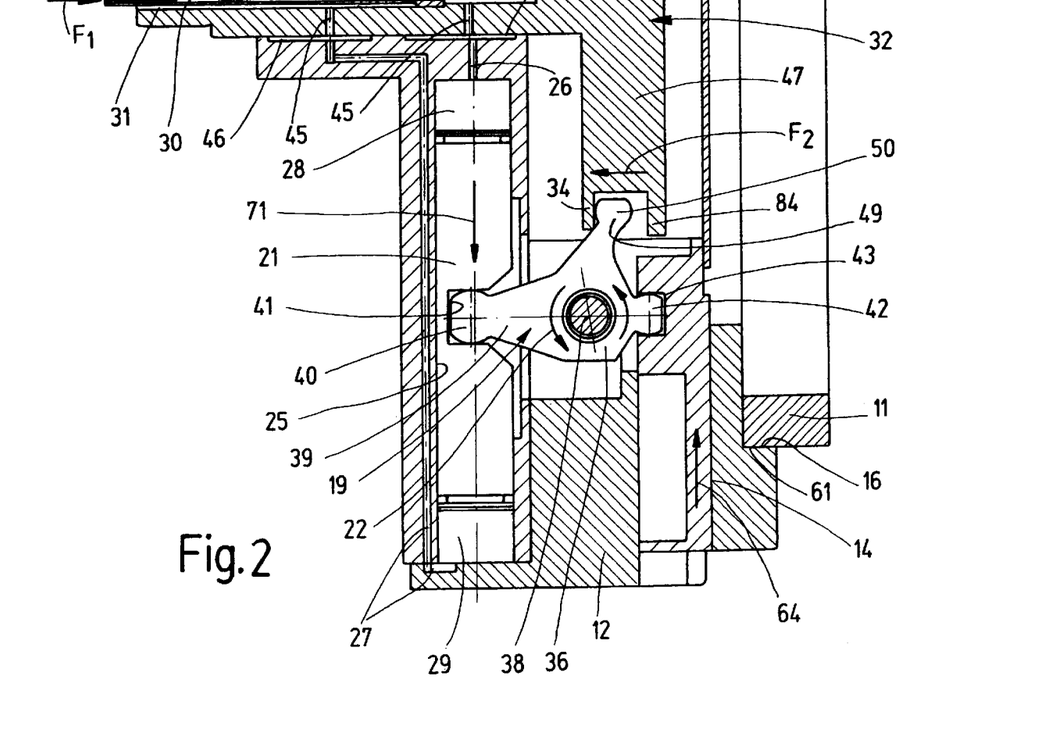

The clamping device in accordance with the present invention is identified with reference numeral 10 and is used for clamping an object 11. In FIG. 1 it is shown in the released position, while FIG. 2 is shown in the clamped position. The object 11 is composed for example of a workpiece to be treated, and can be of any type and shape. The clamping device 10 has a schematically shown housing 12 which is illustrated for better visibility in a simplified way. The housing 12 is here for example a rotation-symmetric structure, which is however not absolutely necessary.

The clamping device has at least two clamping jaws 13 and 14 which are also illustrated in a simplified way and can be formed for example as single-component, double-component or multiple-component clamping jaws. For example, each clamping jaw 13, 14 can be composed of a base jaw and a chuck jaw which are coupled With one another by a pin as disclosed for example in the patent document EP 800 884 A2. Each clamping jaw 13, 14 in the shown embodiment of the clamping device 10 for outer clamping has inner clamping surfaces 15 and 16. The two clamping jaws 13, 14 are guided radially displaceably relative to the longitudinal central axis 17 of the housing 12. This is provided by guiding surfaces on the housing 2. Instead of two clamping jaws 13, 14 also several clamping jaws of this type can be provided, for example three clamping jaws or four or six or eight or ten or twelve clamping jaws, or another odd number as well. The clamping device 10 forms in the shown embodiment a centering and compensating multi-jaw chuck.

Movable actuating elements 18 and 19 are associated with the clamping jaws 13, 14 for their actuation. Each actuating element 18, 19 is acted upon at least in a working position by an associated clamping piston 20 and 21, with which the actuating element 18 and 19 at least in this working position are in operative communication. The above mentioned at least one working position is identified in FIG. 2 with an arrow 22 for the actuating element 19. Each clamping piston 20, 21 is displaceable in an associated cylinder chamber 24 and 25 of the housing 12, and at least for clamping of the associated claw jaw 13 and 14 is acted upon by a pressure of settable pressure means, which is operative at a piston side in the cylinder chamber 24 and 25. Passages 26 and 27 are provided in the housing 12 for supplying and withdrawing of the pressure medium for the corresponding cylinder chamber 24, 25. The passage 26 opens in the first chamber 28 and the passage 27 opens in the second chamber 29.

The first chamber 28 is formed in the cylinder chamber 24, 25 at the end side of the clamping piston 20, 21 which faces inwardly, while the second chamber 29 is formed in the cylinder chamber 24, 25 at the opposite end side of the clamping piston 20, 21 which faces outwardly. Each clamping piston 20, 21 acts in both directions and thereby is loaded selectably with pressure medium from both end sides. In another, not shown embodiment, to the contrary, each clamping piston 20, 21 can be loaded only in one direction with pressure medium, and in particular in a direction which is associated with the clamping of the clamping jaw 13, 14. The passages 26, 27 are connected to a central conduit 30, 31 with a not shown outer pressure medium source or pressure medium sink. The conduit 30, 31 extends centrally and substantially in the region of the longitudinal central axis 17. In another, not shown embodiment, the conduit 30, 31 instead can extend in the housing 12.

At least one central adjusting device 32 is axially displaceably arranged in the housing 12. It acts on the at least two actuating elements 18, 19. Each actuating element 18, 19 has an abutment 33, 34, against which the corresponding associated activating element 18, 19 can abut as shown The corresponding actuating element 18 is designed as an angular lever 35, 36. It is turnably held in the housing 12 around an axial axis 37, 38. It engages on the one hand the associated clamping piston 22, 21 and on the other hand the associated clamping jaw 13, 14. The pistons 20,21, the clamping jaws 13, 14 and the actuating elements 18, 19 formed as corresponding angular lever 35, 36 are of the same construction.

Each of the respective angular levers 35, 36 has a projecting first leg 39 which is oriented substantially transversely to the associated clamping piston 20, 21 and is hingedly connected with the same. The first leg 39 has an end portion formed as a spherical portion 40 that engages in a recess 41 of an associated one of said clamping pistons 20 or 21. The recess 41 is formed as a slit, bore or the like which corresponds to the spherical portion 40. With this design, said angular lever 35, 36 is therefore connected through said first leg 39 in two working directions of said clamping piston hingedly with said clamping piston 20, 21.

Each of said angular levers 35, 36 further has a driver 42 formed preferably as a spherical portion which projects substantially transversely to an associated one of said clamping jaws 13, 14 and is hingedly connected with it in two working directions of the clamping jaw 13, 14. For this purpose, each of the clamping jaws 13, 14 has a recess 43 formed as a slit, bore or the like which corresponds to the spherical driver 42 and into which the driver 42 movably engages with its spherical portion. The driver 42 is located substantially diametrically opposite to the first leg 39 of one of said angular levers 35, 36. Due to this arrangement of the individual angular levers 35, 36 and the hinged connection with the associated clamping piston 20, 21 on the one hand and with the associated clamping jaw 13, 14 on the other, a centrifugal force equalization is obtained at least to a certain extent, because, when mass equality exists, the centrifugal force acting, e.g., on a clamping jaw 13, 14 in the sense of a force application radially outwardly when the clamping device 10 turns is compensated by the centrifugal force acting on a corresponding one of said clamping pistons 20, 21 in the same direction. Centrifugal force equalization can be increased even further by additional mass accumulation or heavier or lighter-weight material.

One can see a respective one of said cylinder chambers 24, 25 and the clamping piston 20, 21 displaceable in it and oriented substantially radially to the longitudinal central axis 17 of the housing 12, and thereby arranged substantially parallel to a radial acting direction of a corresponding one of said clamping jaws 13 or 14. Instead of this, a course that is slightly diagonal compared to the radial working direction is also possible, e.g., to also partially press objects against the housing 12. The axis 37, 38, around which the respective angular lever 35 or 36 is turnable, extends transversely to a radial acting direction of a respective one of said clamping jaws 13 or 14. A bolt secured in the housing 12 is used to provide support.

Each of the angular levers 35, 36 further has a second projecting leg 49 which is arranged in a turning direction of a corresponding one of said angular levers 35, 36 in a peripheral angular distance from said first leg 39 and cooperates at least with an abutment 33, 34 of the adjusting device 32. The peripheral angular distance can have a peripheral angle of more than 90°. The second leg 49 has an end portion provided with a spherical portion 50.

The second leg 49 can abut with this end portion against the end portion 33, 34 in FIG. 1 from right to left.

The adjusting device 32 in the first embodiment shown in FIGS. 1 and 2 has at least one rod 44 which is centrally guided in the housing 12 and extends in the conduit 30, 31. Transverse passages 45 extend from them for the connection to the passages 26, 27, and the transverse passages are open into angular grooves 46. The adjusting device 32 has at least one radially extending part 47 which is connected to the rod 42, for example of one piece with it. The radial part 47 in the example shown in FIG. 1 can be formed also as a disk or a piston. In other not shown embodiment, the radial part 47 is formed differently, for example as a radial finger, a radial segment, a radial oriented spoke, etc. As shown in FIGS. 1, 2, the at least one abutment 33, 34 of the adjusting device 32 is provided on the radial extending part 47, for example of one piece with it.

The abutment 33, 34 is formed each of a substantially radial projection which radially overlaps the second leg 49, in particular the spherical portion 50, of the angular lever 35 or 36. When the radial part 47 is formed as a disk or a piston, the first abutment 33, 34 can be formed in an especially simple manner as a circumferential ring flange.

A not shown drive, for example a pressure medium-flange work cylinder, in particular a hydraulic cylinder, acts on the adjusting device 32 against the movement direction corresponding to clamping of the object 11 and an acting force is identified with the arrow F1. It acts on an opening of the clamping device 10 and so that the adjusting device 32 with its associated first abutment 33, 34 is placed against the end portion of the second leg 49 on the angular lever 35, 36 formed as the spherical portion 50 and thereby abuts on it.

A second embodiment 83, 84 of the adjusting device 82 is associated with each actuating element 18, 19 formed as the angular lever 35 or 36, in particular the spherical portion 50 of the second leg 49. The second abutment 83, 84, when considered along the longitudinal central axis 17 is arranged with an axial distance from the first abutment 33, 34. When the radial part 27 is designed for example as a disk or a piston, it can be also formed as a circumferential flange of a one-piece structure. Also, the second abutment 83, 84 is composed of substantially radial projection which extends substantially parallel to the first abutment 33 or 34. It radially overlaps the second leg 49, in particular the spherical portion of it, at the side, which faces away from the first abutment 33, 34. The first abutment 33, 34 and the second abutment 83, 84 of the adjusting device 42 extends at an axial distance from one another. This distance is greater than the cross-sectional value of the end portion of the second leg 49 which is located between them and formed as a spherical portion 50. Thereby a certain axial gap is provided between the spherical portion 50 and the both-side substantially U-shaped abutment 33, 83 or 34, 84.

The clamping device 10 which is designed in accordance with the first embodiment shown in FIGS. 1, 2 for outer clamping is movable with its at least two clamping jaws 13, 14 for performing the clamping process radially inwardly to its outer clamping position, as illustrated in FIG. 2 for the clamping jaw 14 with the arrow 64. The corresponding angular lever 35, 36 is turnable for clamping in a direction associated with the outer clamping of the clamping jaw 13, 14 in the clamping direction 64. It is illustrated in FIG. 2 for the angular lever 36 with arrow 22, which indicates a turning movement around the axis 38 in counter clockwise direction. For providing the clamping of the corresponding clamping jaw 13, 14, the associated clamping piston 20, 21 is loaded in the associated cylinder 24, 25 in one direction with pressure medium, so as to provide a displacement of the clamping piston 20, 21, radially outwardly. This is shown in FIG. 2 for the clamping piston 21 and identified with reference numeral 71. For this purpose the pressure medium, in particular hydraulic fluid, is supplied under pressure through the conduit 30, the transverse passage 45, the ring grooves 46 and the passage 26 to the first chamber 28 and thereby acts at the radially inward facing end side of the clamping piston 21 in FIG. 2. This is performed from the output position shown in FIG. 1, which shows the released position of the clamping device 10, in which a clamping surface 15 extends in a radial direction from the outer surface 61 of the object 11 and the corresponding clamping jaw 13 assumes its outermost radial position. The adjusting device 32 is loaded with the force F1 which is oriented in FIGS. 1, 2 to the right, whereby the clamping device 10 is held in a non clamping position or an open position.

When the fluid pressure in the first chamber 29 is supplied, then the clamping piston as illustrated for the clamping piston 21 with arrow 31, moves radially outwardly in the cylinder chamber 25. Thereby the angular lever 36 is turned around the axis 31 in the arrow direction 22 (counter clockwise direction). Thereby a force oriented in the arrow direction 64 is applied for clamping through the driver 42 to the clamping jaw 14. The second leg 49 is located with its spherical portion 50 against the abutment 34 and thereby a force F2 which counteracts the force F1 is applied to the abutment 34 and thereby to the radial part 47 of the adjusting device 32. It is adjusted by the corresponding fluid pressure in the chamber 28. The movement of the clamping jaw 14 in the above described manner is performed until it abuts with its clamping surface 16 against the outer surface 61 of the object 11. Thereby first a centering of the object 11 between the clamping jaws 13 and 14 is obtained.

The clamping device provides thereby a radial attaching and guiding of the clamping jaws from outside against the outer surface 61 of the object 11, so that the object 11 is first automatically centered between the clamping jaws 13, 14 and sometimes further available clamping jaws. Depending on the shape of the object 11 and the adapted design of the clamping device 10, in particular of the clamping jaws, during the centering of the object 11 first a single clamping jaw abuts against the outer surface 61 of the object 11. This clamping jaw does not move further. The remaining clamping jaws are placed with the same pressure only one after the other on the outer surface 61 until all clamping jaws are in abutment. For clamping of the object 11 then, a high fluid pressure for example 60 bar supplied. It acts in the chamber 28 and then acts on the clamping jaws in the direction of radial spanning from outside inwardly.

The clamping device 10 has many advantages. It acts to provide centering and has a hydraulic equalization. For performing the clamping it acts with a small differential force F2-F1 and with a relatively small clamping force in arrow direction 24 from the clamping jaws 13, 14 to the object 11 to be clamped, which first is automatically centered and relatively gently engaged without substantial deformation danger. After this centering, the clamping is performed with increased fluid pressure, during which the clamping jaw 13, 14 and sometimes further clamping jaws must not cover significant further radial distances. The clamping device 10 makes possible great clamping distances and the transfer of very high clamping forces. With the above described design, in particular through lever action, it achieves a force amplification. The clamping device 10 has a very flat construction and is therefore space-consuming and compact.

For transferring the clamping device 10 to the release position shown in FIG. 1, the fluid pressure acting the chamber 28 reduces at least so that the force F2 is at least significantly smaller than the force F1, so that the force F1 acting on the adjusting device 32 displaces the adjusting device 32 in FIG. 2 to the right to the position in accordance with FIG. 1. When desired, this return to the open position can be supported in that the fluid pressure is supplied into the corresponding chamber 29 and thereby a radially inwardly oriented force acts on the corresponding clamping piston 20, 21 as identified in FIG. 1 with a broken arrow 70. The corresponding angular lever 35, 36 is turned in direction of the broken arrow 23 and the respective clamping jaw, as shown for the clamping jaw 13 in FIG. 1, is moved radially outwardly in direction of the broken arrow 63.

It is to be understood that the distance between the first abutment 33, 34 on the one hand, and the second abutment 83, 84 on the other hand is sufficiently great so that during turning of the angular lever 35, 36 in the turning direction which corresponds to the clamping of the clamping jaw 13, 14, in view of the cross-sectional value of the spherical portion of the second leg 49 sufficient axial space is provided, that after centering abutment of the one or another available clamping jaw further clamping jaws are acted further in the clamping direction and during further turning of the angular lever 35, 36 in the working direction in accordance with the arrow 22 can move in the clamping direction in accordance with the arrow 64. Thereby by the abutment of the spherical portion 50 against the abutment 33, 34 the adjusting device 32 is axially displaced further against the force F2 to the left of FIGS. 1–2 while the other angular lever is no longer turned, its clamping jaws are again already in the centering position with the object 11.

It can be further recognized that with the pressure action of the clamping piston, as shown only in FIG. 2 for the clamping piston 21, the pressure fluid supplied in the chamber 28 drives the angular lever 36 through its first leg 39 from the clamping piston 21 and turns in turning direction of arrow 22 which corresponds to the clamping with accompanying actuation of the associated clamping jaw 14 through the driver 42 in the clamping direction and with a clamping force, while the end portion of the second leg 49 which is formed as a spherical portion 50 abuts against the abutment 34 of the adjusting device 32 and through this abutment contact drags further the adjusting device 32 opposite to the opening force F1 acting in the opening direction, when after reaching the centering of the object 11 to be clamped one or several clamping jaws and through them the associated angular levers are locked in their position without movement.

The force produced by action on the corresponding clamping piston, in FIG. 2 the clamping piston 21 by supplying the pressure fluid into the chamber 28 in direction of the arrow 71, results because of the abutment of the spherical portion 50 against the abutment 34 on the adjusting device 32, in a force F2 which counteracts the opening force F1. The force F2 must be only significantly greater than the force F1. The difference force F2-F1 is the force acting toward the abutment, at least for reaching an automatic hydraulic centering of the object 1 located between the clamping jaws, which leads to a soft engagement of the object.

Figure 3:
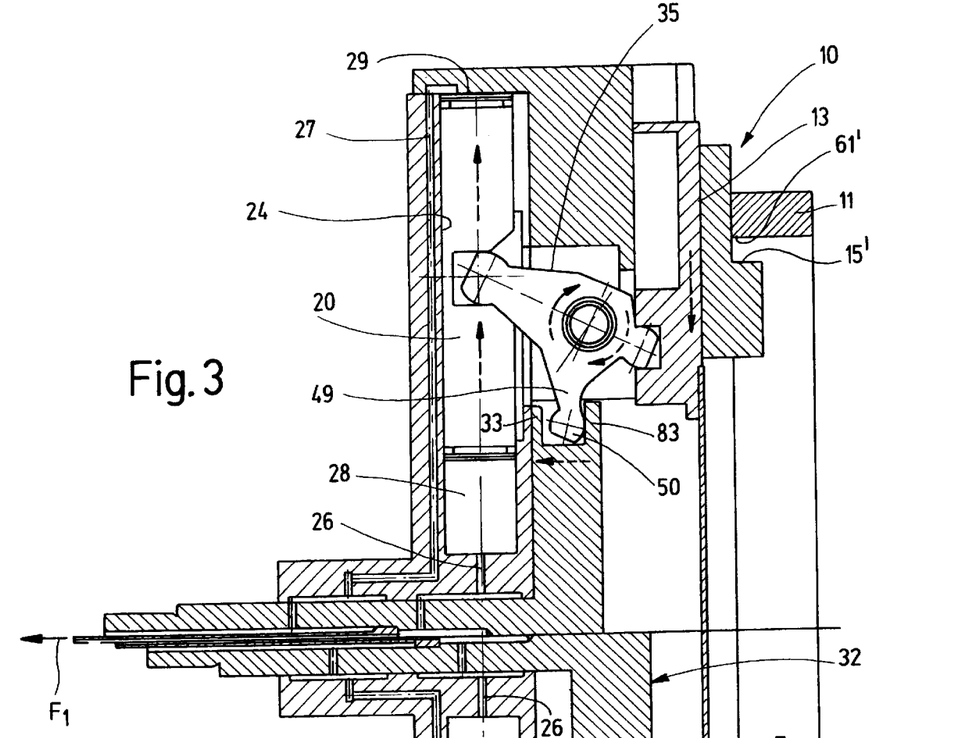
FIGS. 3 and 4 are views showing a schematic cross-section of a clamping device for inner clamping, with released position shown in FIG. 3 and clamped position shown in FIG. 4.
Figure 4:
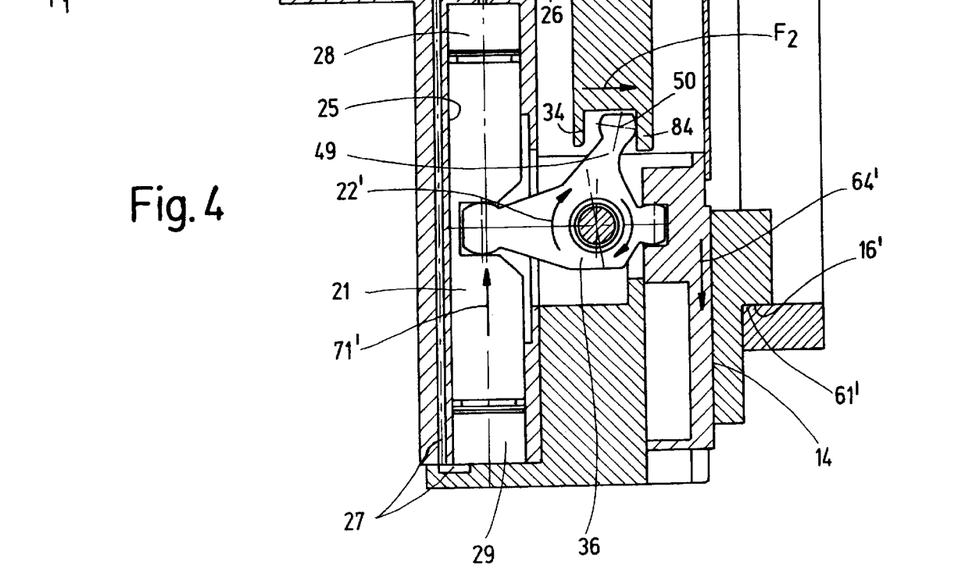

The clamping device shown in FIGS. 3 and 4 practically corresponds to that shown in FIG. 1, with the only difference that the clamping device of FIGS. 3 and 4 is used for inner clamping. Thereby the clamping jaws 13, 14 are provided with outer clamping surfaces 15' and 16', which for the inner clamping can engage the inner surface 61' of the object 11. The clamping jaws 13, 14 are movable from inside outwardly to their inner clamping position as shown in FIG. 2, or oppositely radially from outside inwardly to move to non-clamped position shown in FIG. 3. The adjusting device 32 which is acted upon by a not shown drive, for example a pressure medium-actuated working cylinder, in a movement direction which is opposite to the direction corresponding to the clamping, from right to left in FIGS. 3 and 4 with the force F1. It holds the clamping device 10 open and acts so that the adjusting device 32 with the other abutment 83 or 84 is pressed against the end portion of the second leg 49 of the angular lever 35, 36 which is formed as the spherical portion 50 and abuts against it. For clamping, a pressure medium is supplied in the chamber 29 and thereby the end surface of the clamping piston 20, 21 facing radially outwardly is loaded with the pressure fluid, so that the corresponding clamping piston such as the clamping piston 21 in FIG. 4 is moved in direction of the arrow 71'. This results in a turning actuation of the angular lever 36 shown in FIG. 4 in direction of the arrow 22' in clockwise direction, which results in the arrow direction 64' in a radial displacement of the clamping jaw 14 shown in FIG. 4 radially from inside outwardly and to the clamping position. By the abutment of the spherical portion 50 of the second leg 49 against the abutment 84, the force F2 oriented to the right in FIG. 4 is applied to the adjusting device 32. It counteracts the opening force F1, is at least insignificantly greater than this force, so that the clamping jaws, such as the clamping jaw 14 is acted upon with a radial force which corresponds to a relatively low differential pressure and correspondingly the object 11 by the first performed centering is moved relatively soft radially from inside outwardly.

When the clamping device 10 shown in FIGS. 3 and 4 is transferred from the clamping position of FIG. 4 back into the opening position of FIG. 3, then the pressure in the chamber 29 is reduced, for example so that the force F2 becomes smaller than the opening force F1 and thereby the adjusting device 32 acted by the force F1 provides the return position in the outward position of FIG. 3. The return position can be supported by introducing a pressure fluid into the chamber 28.

In the first embodiment of FIGS. 1 and 2, the clamping device 10 is formed only for outer clamping, while in the second embodiment of FIGS. 3 and 4 the clamping device 10 which is practically identical to the device of FIG. 1 is formed only for inner clamping.

In accordance with another, not shown embodiment the clamping jaw 13, 14, are provided both with inner clamping surfaces 15, 16 and with outer clamping surfaces 15', 16'. The clamping device 10 is suitable and can be used both for outer clamping and for also, with a reverse working direction, for inner clamping. The pressure medium acts on the corresponding clamping piston 20, 21 in the corresponding cylinder chamber 24, 25, to act either for inner clamping or for outer clamping. The corresponding angular lever 35, 36 is turnable in the turning direction associated with the outer clamping and/or in the opposite turning direction associated with the inner clamping. The at least one adjusting device 32 is oriented in a displacement direction associated with the outer clamping which is from right to left in FIGS. 1 and 2 and/or in the opposite displacement direction associated with the inner clamping from left to right in FIG. 3,4. It is effective against the action of the corresponding opposite opening force F1 from left to right in FIGS. 1, 2 while it is effective from right to left in FIGS. 3, 4.

In the first embodiment corresponding to FIGS. 1, 2 and the second embodiment corresponding to FIGS. 3, 4 the corresponding clamping device 10 has a single rim row of the clamping jaws 13, 14 with associated clamping pistons 20, 21 and angular levers 35, 36 as well as clamping jaws 13, 14. In another, not shown embodiment instead two or several axially spaced rim rows of clamping pistons 20, 21 can be provided with the angular levers 35, 36 and the associated abutments 33, 34, 83, 84 of the adjusting device 32. Their two or more axial spaced rim rows of the corresponding clamping jaws 13, 14 are arranged for actuation.

In another not shown embodiment the individual cylinder chambers 24, 25 are arranged not radially, but instead substantially axis-parallel to the longitudinal central axis 17. In a corresponding arrangement, the individual clamping pistons 20,21 are arranged also substantially parallel to the longitudinal central axis 17 and displaceable, while the coupling with the corresponding actuating element 18, 19, in particular the angular levers 35, 36 can be performed in the region of an end side of a corresponding clamping piston, for example, the end side which faces the radial plane, in stead which the clamping jaws 13, 14 can be arranged displaceable in correspondence with Figures. The corresponding angular lever 35, 36 in this not shown embodiment is modified for adaptation to the substantially axis-parallel arrangement of the clamping pistons 20, 21, for example so that the first leg 39 shown in FIGS. 1–4 extends at another point and therefore for example substantially at an angle of 90° to the leg which carries the driver 42. The second leg 49 shown in FIGS. 1–4 can therefore be united with the above mentioned first leg 39 to form a single component, which with its for example substantially semi-spherically extending projection, similarly to the half spherical portion 50 abuts against an abutment 83, 84 of the adjusting device 32 and with its opposite flat region abuts axially against the substantially axis-parallel clamping pistons 20, 21. These abutments during the axial movement of the corresponding clamping pistons and thereby the turning movement of the corresponding angular lever allow a relative movement between the end of the clamping pistons 20, 21 on the one hand and the abutting region of the angular lever 35, 36 on the other hand. It is to be understood that also the other couplings of the angular levers both to the adjusting device and to the facing end of the corresponding axis-parallel clamping piston are possible within the frame of the invention.

Figure 5:
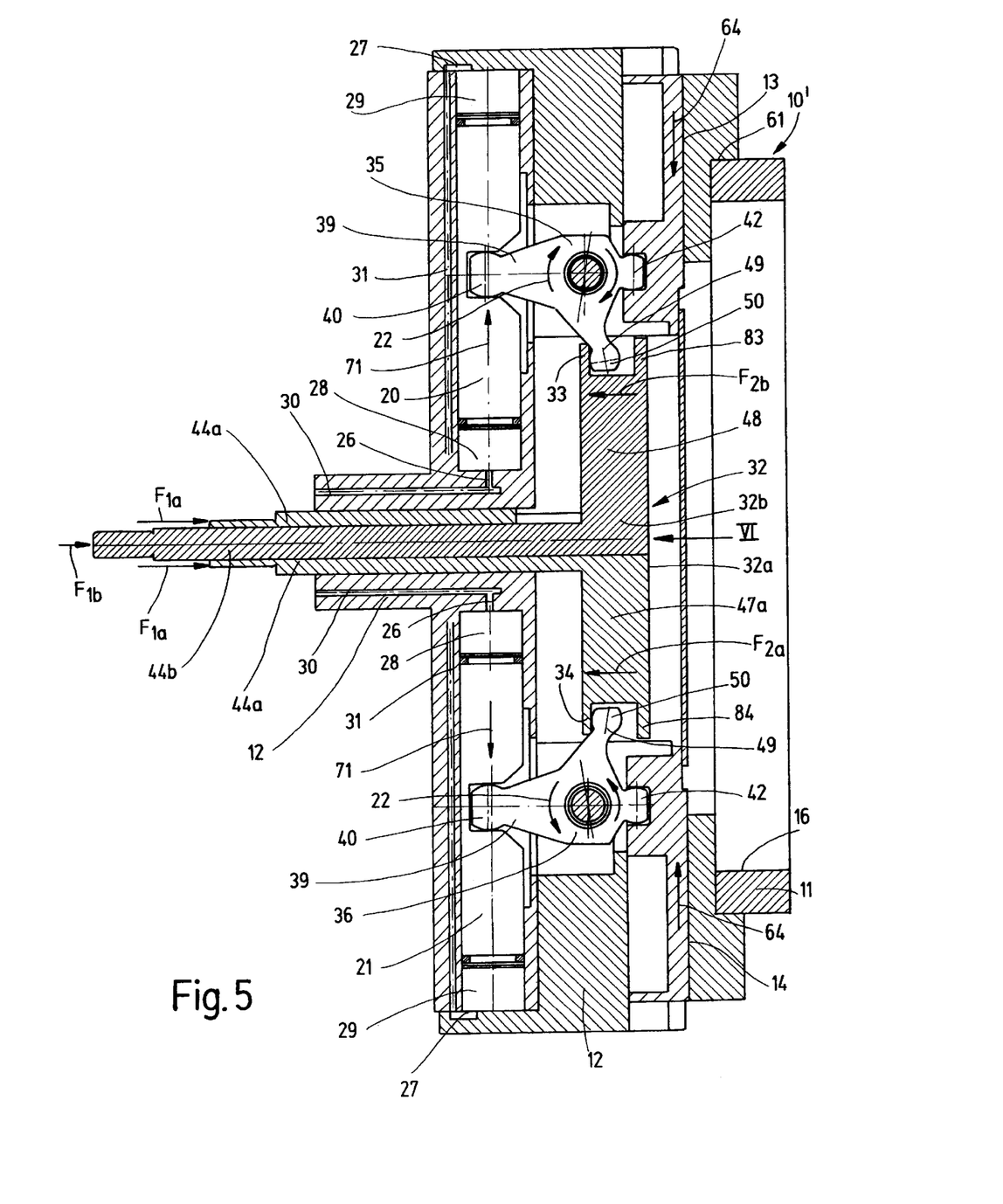
FIG. 5 is a schematic cross-section of a clamping device for outer clamping in accordance with a third embodiment, sectioned along the line V—V in FIG. 6 in the clamped positions.
Figure 6:
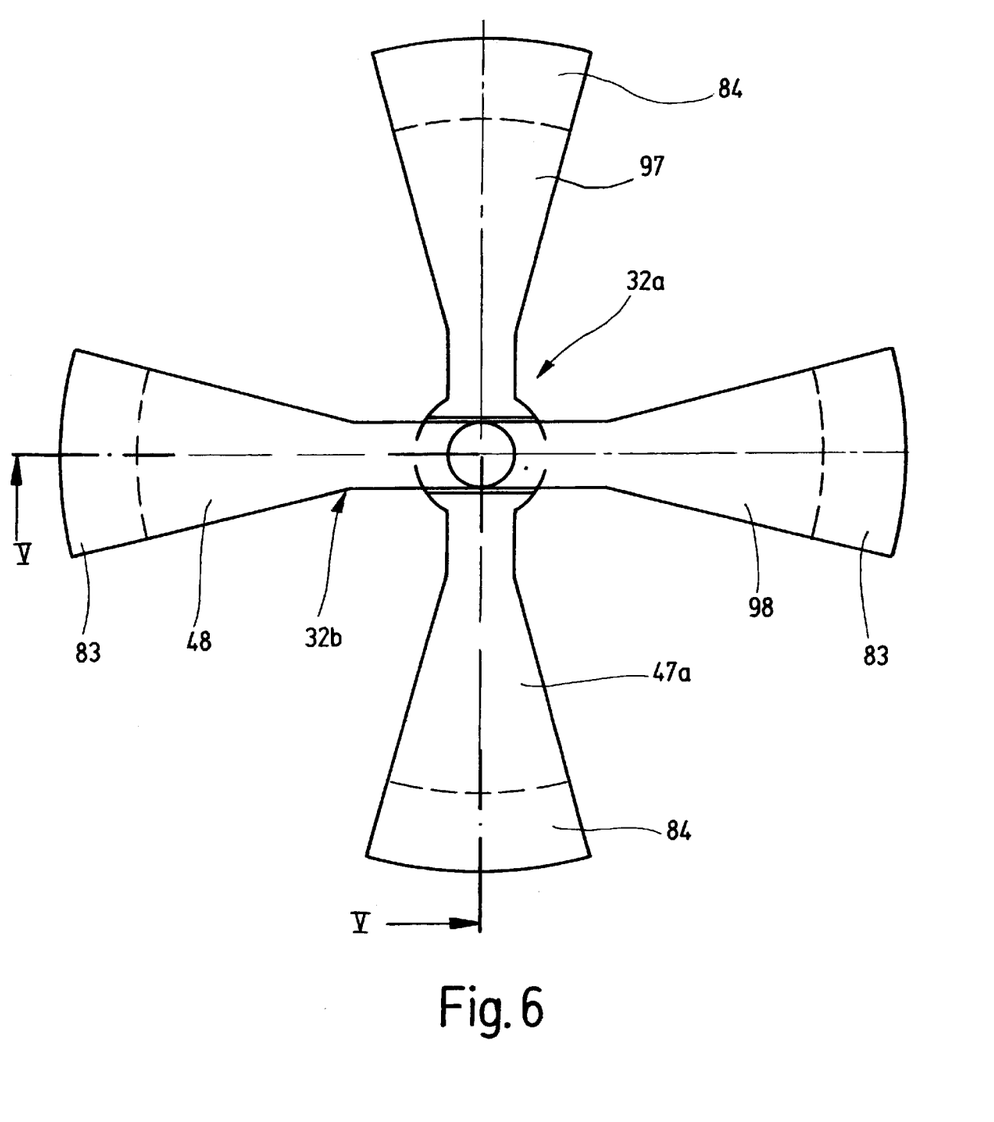
FIG. 6 is a schematic end-side view in direction of the arrow VI in Figure of a part of the clamping device.

In the third embodiment shown in FIGS. 5 and 6, the adjusting device 32 is subdivided into two groups 32a, 32b which when needed are actuated independently from one another. The one group 32a has an inner hollow rod 44a and further at least one radially extending part which in the shown embodiment has two diametrically opposite, radially extending parts 47a, 97. They are designed as substantially radial arms and analogously to the previous embodiment provided with the abutments, from which in FIG. 5 the abutments 34 and 84 for the radial part 47a are visible. The second group 32b has a rod 44b which is for example displaceably guided inside the hollow rod 44a and on it has one several radially extending parts, in the shown embodiment two radial extending parts 48, 98 which are located diametrically opposite to one another and designed as radial arms. Analogously to the first and second embodiment, it also has abutments for the radial part 48 which in FIG. 5 are visible and identified with reference numerals 33, 83.

The individual radial parts 47a, 97a as well as 48, 98 are located substantially inside joint radial plane. This is true further both for the abutments 83, 84 and also for the abutments 33, 34. The one group 32a of the adjusting device as shown in FIG. 5 is loaded from left to right with the force F1a, which is effective in direction to an opening of the clamping jaws associated with both radial parts 47a, 97a. In FIG. 5 only one clamping jaw 14 is visible, with which the radial part 47a of the first group 32a of the adjusting device 32 is associated. The second group 32b of the adjusting device 32 is loaded with a force F1b which acts in the same direction as F1a and also acts for opening of the clamping jaws associated with these radial parts 48, 98, from which FIG. 5 shows only one clamping jaw 13.

As can be further seen from FIGS. 5 and 6, the two adjusting devices 32a, 32b are provided. The adjusting device 32a in correspondence with the diametrically oppositely located radial parts 47a, 97 is associated with two diametrically opposite clamping jaws as well as two substantially diametrically opposite clamping pistons and corresponding associated actuating elements in form of angular levers analogously to the preceding embodiments. A pressure loading of the clamping piston radially from outside inwardly leads to an outer clamping in direction of the arrow 64 of the object 11. The second adjusting device 32b is associated with diametrically opposite radial parts 48, 98 and two diametrically opposite clamping jaws as well as corresponding clamping pistons and two actuating elements in form of angular levers. During the pressure loading of the clamping pistons in a clamping direction by associated clamping jaws, also a centering or clamping of the object 11 is performed radially from outside inwardly. During clamping a corresponding force F2a or F2b is active, which is opposite to the opening force F1a or F1b and when compared to it is at least insignificantly greater. The object 11 can be centered or clamped with a differential force. It is to be understood that both adjusting devices 32a on the one hand and 32b on the other hand can be actuated either simultaneously or when needed also independently from one another in clamping direction or loosening direction. It is further to be understood that the clamping device 10' in FIGS. 5 and 6 instead outer clamping as shown can be also formed to perform inner clamping.

FIG. 5 shows that in deviation from the preceding embodiments, the conduits 30, 31 for the supply or withdrawal of the fluid in the housing 12 are provided. Instead they can also extend outside of the housing 12.

For avoiding unnecessary repetition, in the third embodiment of FIGS. 5 and 6, the parts which respond to the parts of the previous embodiment have the same reference numerals so that their description is not necessary.

It will be understood that each of the elements described above, or two or more together, may also find a useful application in other types of constructions differing from the types described above.

While the invention has been illustrated and described as embodied in clamping device for objects, for example for workpieces to be treated, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A clamping device for objects, comprising a housing, at least two clamping jaws which are radially displaceably guided relative to a longitudinal central axis; actuating elements associated with said clamping jaws for actuating the latter; clamping pistons displaceable in a cylinder chamber and acted for clamping of said clamping jaws by a pressure medium under pressure at least in one working direction, said actuating elements being in operative communication with said clamping pistons at least in a working position; at least one central adjusting device displaceably arranged in said housing and acting on said actuating elements; abutment means including an abutment for each of said actuating elements against which each of said actuating elements can abut, said actuating elements being formed as angular levers which are turnably held in said housing and engage with an associated one of said clamping pistons and with an associated one of said clamping jaws.

2. A clamping device as defined in claim 1, wherein each of said angular levers has a projecting first leg which is oriented substantially transversely to an associated one of said clamping pistons and is hingedly connected with the same.

3. A clamping device as defined in claim 1, wherein said angular lever is connected through said first leg in two working directions of said clamping piston hingedly with said clamping piston.

4. A clamping device as defined in claim 2, wherein said angular lever engages with an end portion of said first leg in a recess of said clamping piston.

5. A clamping device as defined in claim 4, wherein said end portion of said first leg is formed as a spherical portion.

6. A clamping device as defined in claim 4, wherein said recess of said clamping piston is formed as a recess which corresponds to said spherical portion of said first leg.

7. A clamping device as defined in claim 1, wherein each of said angular levers have a driver which projects substantially transversely to an associated one of said clamping jaws and is hingedly connected with it.

8. A clamping device as defined in claim 7, wherein said driver in both working direction of said clamping jaw is hingedly connected with the clamping jaw.

9. A clamping device as defined in claim 7, wherein said driver is formed as a spherical portion.

10. A clamping device as defined in claim 1, wherein a respective one of said clamping jaws has a recess in which a driver with a spherical portion is movably engaged.

11. A clamping device as defined in claim 10, wherein said recess is formed as a recess which corresponds to said spherical portion of said driver.

12. A clamping device as defined in claim 7, wherein said driver of said angular lever is located diametrically opposite to said first leg.

13. A clamping device as defined in claim 1, wherein a respective one of said cylindrical chambers and a clamping piston is displaceable in it is oriented substantially radially to said longitudinal central axis of said housing.

14. A clamping device as defined in claim 1, wherein said a respective one of said cylindrical chambers and a clamping piston displaceable in it is oriented substantially axis-parallel to said longitudinal central axis of said housing.

15. A clamping device as defined in claim 1, wherein a respective one of said cylindrical chambers and a clamping piston displaceable in it is arranged substantially parallel to a radial acting direction of a corresponding one of said clamping jaws.

16. A clamping device as defined in claim 1, wherein a respective one of said cylindrical chambers and a clamping piston displaceable in it is arranged substantially transversely to a radially working direction of a corresponding one of said clamping jaws.

17. A clamping device as defined in claim 1, wherein a respective one of said angular levers is held turnably such an axis which extends transversely to a radial acting direction of a respective one of said clamping jaws.

18. A clamping device as defined in claim 1, wherein a respective one of said angular levers has a second projecting leg which is arranged in a turning direction of said angular lever in a peripheral angular distance from said first leg and cooperate with an abutment of said adjusting device.

19. A clamping device as defined in claim 18, wherein said peripheral angular distance has a peripheral angle of more than 90°.

20. A clamping device as defined in claim 18, wherein said second leg of said angular lever has an end portion provided with a spherical portion.

21. A clamping device as defined in claim 1, wherein a respective one of said abutments of said adjusting device is formed on a substantially radial projection which radially overlaps an end portion of said second leg.

22. A clamping device as defined in claim 1, wherein said adjusting device is provided with a drive which loads it in a movement direction which is opposite to clamping with a force which acts to open said clamping device and operates so that said adjusting device presses with its abutment against an end portion of the second leg of said angular lever and abuts against it.

23. A clamping device as defined in claim 1, wherein each actuating elements which is formed as an angular lever is associated with a first abutment and further a second abutment of said adjusting device, said abutments being arranged at an axial distance relative to one another.

24. A clamping device as defined in claim 23, wherein each abutment is formed as a substantially radial projection, one of said abutments radially overlapping said second leg on one side while the other of said abutments radially overlaps the second leg on an opposite side.

25. A clamping device as defined in claim 1, wherein a first abutment and a second abutment of said adjusting device are arranged at such an axial distance from one another that it is greater than a cross-sectional value of end portions extending therebetween of said second legs of said angular levers.

26. A clamping device as defined in claim 24, wherein a distance between said first abutment and said second abutment is selected so that a during pressure loading of a respective one of said clamping pistons in a working direction which is associated with clamping in a clamping direction, the angular lever is taken through its first leg by said clamping piston and in its first turning position associated with the clamping is turned with accompanying loading of the respective associated clamping jaw through said driver in a clamping direction and with a clamping force, while the end portion of said second leg abutting against an abutment of said adjusting device while through said abutment contact said adjusting device is taken opposite to the opening force acting in an opening direction, and after reaching centering of the object to be clamped, one or several clamping jaws can be fixed through the associated angular levers without further movement.

27. A clamping device as defined in claim 1, wherein with pressure action on a respective one of said pistons in a direction which is associated with clamping in a clamping direction, a force is produced and acts on said adjusting device opposite to an opening force and is greater than an opening force, and a differential force of these forces is efficient for clamping in a clamping direction.

28. A clamping device as defined in claim 1, wherein said adjusting device has at least one centrally guided rod in a housing.

29. A clamping device as defined in claim 1, wherein said adjusting device has at least one radially extending part which is formed as an element selected from the group consisting of a radial finger, a radial segment, a disk and a piston.

30. A clamping device as defined in claim 29, wherein at least one of said abutments of said adjusting device is provided on a radially extending part.

31. A clamping device as defined in claim 1, wherein said adjusting device as considered in an adjusting direction, has several axially spaced groups at abutments.

32. A clamping device as defined n claim 1; and further comprising at least two axially projecting toothed rows of associated clamping pistons with angular levers, associated abutments of said adjusting device, and clamping jaws.

33. A clamping device as defined in claim 1, wherein said adjusting device is subdivided into at least two activating individual groups, which when necessary are independent from one another.

34. A clamping device as defined in claim 33, wherein one of said groups of said adjusting device has a hollow rod with one or several radially extending parts and abutments, while a second one of said groups inside a hollow rod has two rods with one or a few radial extending parts and abutments, said abutments of said first group being located at least substantially at a same radial plane as the abutments of the second group.

35. A clamping device as defined in claim 33, wherein one of said groups of said adjusting device has a hollow rod with one or several radially extending parts and abutments, while a second one of said groups inside a hollow rod has two rods with one or a few radial extending parts and abutments, said abutment of said first group being located in an opposite, offset radial plane as the abutments of the second group.

36. A clamping device as defined in claim 33, wherein said clamping jaws are provided with inner clamping surfaces operating for outer clamping and/or with outer clamping surfaces operating for inner clamping and moveable radially inwardly and/or radically outwardly to its corresponding outer clamping position or inner clamping position in opposite directions.

37. A clamping device as defined in claim 1, wherein each of said clamping pistons is loaded with pressure medium in an associated one of said cylinder spaces in a direction or in an opposite direction or in both directions.

38. A clamping device as defined in claim 1, wherein a corresponding one of said angular levers is turnable in a turning direction associated With an outer clamping of a corresponding one of said clamping jaws and/or in an opposite turning direction associated with an inner clamping of said clamping jaw.

39. A clamping device as defined in claim 1, wherein said adjusting device is displaceable during outer clamping of said clamping jaw in associated displacement direction and/or is displaceable in an opposite displacement direction associated with the inner clamping of the clamping jaw.

40. A clamping device as defined in claim 38, wherein said adjusting device is formed so that an opposite force acts against an action of said adjusting device.

* * * * *